United States Patent [19]
Oomen

[11] 3,704,409
[45] Nov. 28, 1972

[54] DIGITAL REFLECTION COEFFICIENT DETECTOR
[72] Inventor: Johannes A. F. Oomen, Cincinnati, Ohio
[73] Assignee: Avco Corporation, Cincinnati, Ohio
[22] Filed: May 24, 1971
[21] Appl. No.: 146,069

[52] U.S. Cl. .............................. 324/57 R, 324/58 B
[51] Int. Cl. ........................................... G01r 27/00
[58] Field of Search .......... 324/57 R, 58 B, 58.5 B; 307/222 R; 328/44

[56] References Cited

UNITED STATES PATENTS 3,197,696  7/1965  Bibo ..................... 324/57 R X
3,192,478  6/1965  Metz ........................... 328/44

FOREIGN PATENTS OR APPLICATIONS 494,130  6/1953  Canada ....................... 324/57

OTHER PUBLICATIONS

Burkart et al., Digital Motion Verifier, IBM Technical Disclosure Bulletin, Feb. 1971, p 2580.

Primary Examiner—Stanley T. Krawczewicz
Attorney—Charles M. Hogan

[57] ABSTRACT

There are shown herein an apparatus and method for indicating and storing the modulus of the reflection coefficient in a radio frequency system. The apparatus makes use of voltages $E_r$ and $E_f$. Voltage $E_r$ is a measure of the power reflected back from the load. Voltage $E_f$ is a measure of the forward power sent toward the load by the source. The analog quantities $E_r$ and $NE_f$ are applied to a comparator, the output of which is utilized to control an up-down counter which stores the quantity N, the modulus of the reflection coefficient. The up-down counter controls a digital to analog converter which utilizes the quantity $E_f$ as a reference and produces the analog output $NE_f$.

2 Claims, 2 Drawing Figures

INVENTOR.
JOHANNES A. F. OOMEN
BY Charles M. Hogan
ATTORNEY.

DIGITAL REFLECTION COEFFICIENT DETECTOR

BACKGROUND OF THE INVENTION

The degree to which a transmission line or other radio frequency system of lumped and/or distributed parameters is tuned has generally been established by measuring reflected power. However, reflected power depends upon a number of variables including the reflection coefficient of the load and also the output impedance and power of the source. It would be desirable to provide a device and process for measuring the reflection coefficient modulus directly and indicating and storing it digitally, independent of the source impedance and power output variables.

The primary object of the present invention is to provide such device and process.

My invention is based in part on a recognition of the fact that the definition of reflection coefficient is independent of source impedance or source output power. That is to say $$|\bar{p}|=|E_r/E_f|$$

where
$E_r$ = reflected voltage
$E_f$ = forward voltage

The inventive combination utilizes measures of forward and reflected voltage. It is known to the art that a bidirectional coupler permits simultaneous sampling of signal flow in two directions. It is therefore used to furnish the required forward voltage and reflected voltage parameters. See *Airborne Radar*, Grayson Merrill ed., p. 548 (New York: D. Van Nostrand Co., Inc., 1961). For this reason a bidirectional coupler will be shown in block diagram herein, without a detailed description.

In accordance with the invention an analog to digital converter is utilized to perform a dividing function and to indicate the result. The preferred form of converter herein disclosed, by way of illustration and not of limitation, is the feedback voltage-input encoder type. For background and state-of-the-art literature on feedback voltage-input encoders and ladder systems for converting a digital number in an up-down register to an analog voltage, please see the following: *Digital Computer Components and Circuits*, R. K. Richards, pp. 459–503, particularly pages 489–491, (New York: D. Van Nostrand Co., Inc., 1957); *Handbook of Telemetry and Remote Control*, Elliot L. Gruenberg, pp. 11–13 to 11–20, particularly p. 11–19, (New York: McGraw Hill Book Co., Inc. 1967); *Digital Computer and Control Engineering*, Robert Steven Ledley, pp. 739–763, (New York: McGraw Hill Book Co., Inc. 1960); *Aerospace Telemetry*, Harry L. Stiltz, ed., pp. 179–183, (Englewood Cliffs, N.J.: Prentice Hall, Inc., 1961); *Computer Handbook*, Harry D. Huskey and Granino A. Korn, ed., pp. 18–29 to 18–46, (New York: McGraw Hill Book Co., Inc., 1962); and *Digital and Sampled Data Control Systems*, Julius E. Tou, pp. 377–404, (New York: McGraw Hill Book Co., Inc., 1959).

THE DRAWINGS

For a better understanding of the invention, together with other and further objects, advantages and capabilities thereof, reference is made to the following description of the accompanying drawings, in which:

FIG. 1 is a block diagram form of a preferred reflection coefficient detector in accordance with the invention, and FIG. 2 is a circuit diagram of a converter circuit of the ladder type, suitable for use in the system.

DETAILED DESCRIPTION OF THE INVENTION

Figure 1:
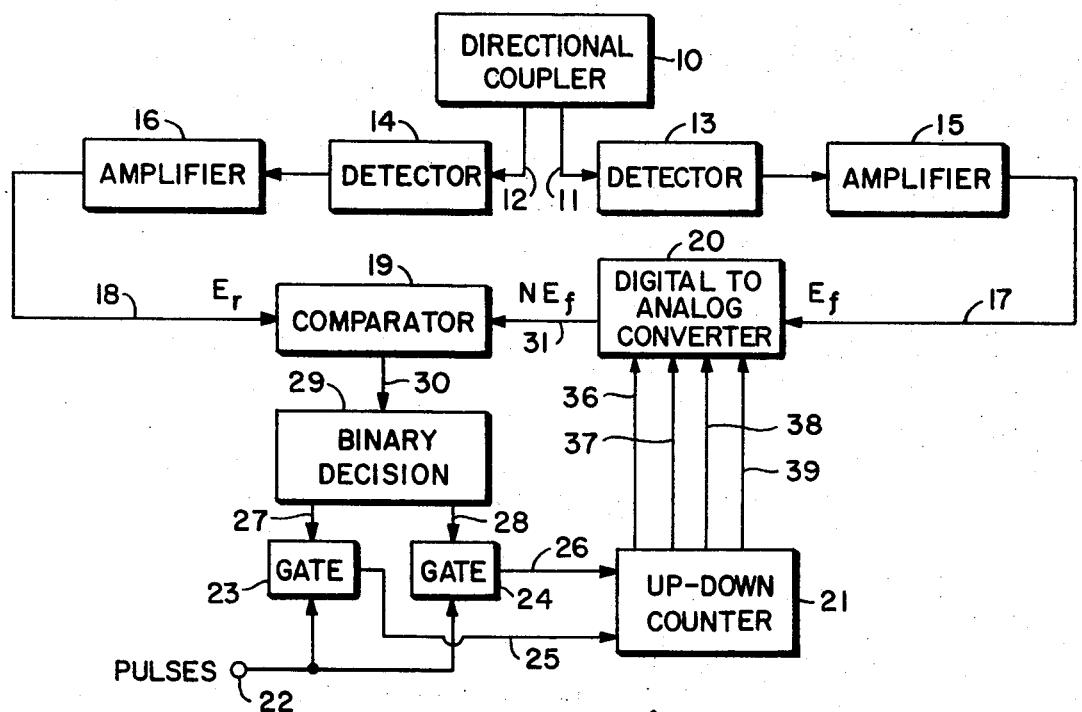

Referring first to FIG. 1, there is shown a bidirectional coupler 10 which is so arranged as to provide a forward power output 11 and a reflected power output 12, respectively coupled to detectors 13 and 14. The directional coupler 10 is disposed between an r.f. (i.e. radio frequency) source and r.f. load of a radio frequency system to be tuned and it incorporates the customary output ports 11 and 12. The detectors 13 and 14 have outputs respectively coupled to output lines 17 and 18, respectively, via amplifiers 15 and 16, respectively.

The elements 10–18 function collectively to provide reflected voltage, the parameter $E_r$, on line 18 and forward voltage, the parameter $E_f$ on line 17.

In accordance with the invention two analog inputs are applied to a comparator device 19. One is the reflected voltage $E_r$ and the other is a product of N and $E_f$, N being the modulus of the reflection coefficient and $E_f$ being the forward voltage.

The dividing function by reason of which the modulus of the reflection coefficient N is directly registered by an updown counter 21 is performed by the elements now described.

A source of clock pulses indicated at 22 is coupled via additive gate 23 and subtractive gate 24 to up input 25 and down input 26, respectively, of the up-down counter 21. These gates are individually coupled to the up output 27 and the down output 28 of a binary decision network 29. The binary decision network 29 has an input coupled to the output of the comparator 19, as shown at 30. The operation is such that when $E_f$ decreases with respect to an established equilibrium position, the quantity $NE_f$ also decreases and the output of the comparator on line 30 is such that the binary decision network 29 activates its up output 27, activating gate 23 so that additional pulses flow from the source 22 into the counter 21, to reflect the increase in N, until a new equilibrium is reached. By contrast, an increase in the forward voltage is accompanied by a signal on the output 30 of comparator 19 of such character that the binary decision device 29 activates its control output 28, activating gate 24, so that pulses are gated from source 22 via line 26 to subtract from the digital number registered in the up-down counter 21. Accordingly the up-down counter functions continuously to store, to record, and to indicate the modulus of the reflection coefficient, i.e., N.

It will be observed that, in accordance with the concepts of the invention, the analog quantities $E_r$ and $E_f$ are first derived. One of them, to-wit: the reflected voltage, is then directly utilized as an analog input to the comparator of a conventional feedback voltage-input encoder. The other quantity $E_f$ is used as the reference voltage for a digital to analog converter, which supplies the other comparator input $NE_f$ on its output line 31. In effect, two analog signals are divided and a binary result is registered in the up-down counter 21.

Figure 2:
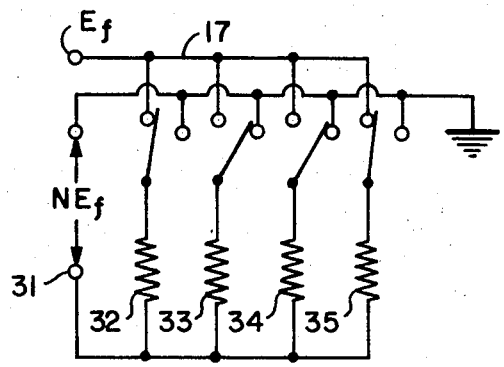

A suitable type of converter is illustrated in FIG. 2, which symbolically indicates suitable circuit content for block 20. The ladder network there shown is a form of digital to analog converter that is well known to the art. The reference voltage $E_f$ appears on line 17. The quantity $NE_f$ appears on output line 31. Resistors 32, 33, 34 and 35 may individually be switched in binary fashion either to the reference voltage $E_f$ or to ground potential. It will be understood that the switching is controlled electronically by the up-down counter 21. The ladder network of FIG. 2 produces an output voltage which is an analog function of the digital number indicated by the settings of the four switches. As indicated, switching is electrically performed by the outputs 36, 37, 38 and 39 of the up-down counter 21.

It has been shown that the digital number in the up down counter represents the ratio between the quantities $E_r$ and $E_f$. Strictly speaking, the number registered in the up-down counter is the modulus of the reflection coefficient.

While there has been shown and described what is at present believed to be the preferred embodiment of the invention, it will be understood by those skilled in the art that various modifications and changes may be made therein without departing from the proper scope of the invention as defined by the claims hereto annexed.

Having described my invention, I claim:

1. In a radio frequency system in which power is transferred from a source to a load, the combination of:
   means for deriving the reflected voltage or quantity $E_r$,
   means for deriving the forward voltage or quantity $E_f$,
   and a feedback voltage input encoder comprising:
   a comparator having a first input for the voltage $E_r$ and also a second input,
   an up-down counter,
   a digital to analog converter having an output coupled to the comparator and having also an input,
   the quantity $E_f$ being applied to said converter input and the quantity $NE_f$ being the converter output so that the comparator output produces a signal indicating whether $E_r$ or $NE_f$ is greater,
   a source of clock pulses,
   and means coupled to the comparator for channeling the pulses to the up-down counter in such fashion as to increase the count when the quantity $E_r$ prevails and to decrease the count when the quantity $NE_f$ prevails, whereby the up-down counter registers the modulus N of the reflection coefficient.

2. In a radio frequency system in which power is transferred from a source to a load, a reflection coefficient modulus detector comprising:
   means for deriving the reflected voltage or quantity $E_r$,
   means for deriving the forward voltage or quantity $E_f$,
   converter means providing digital storage and having an input to which the voltage $E_f$ is applied as a reference and also an analog output producing a voltage equal the product of $E_f$ and N,
   means for comparing the quantities $E_f$ and $NE_r$ and producing a bidirectional control signal, and
   means coupled to the converter means for utilizing the bidirectional control signal to establish the digital settings of said converter, whereby said settings are a measure of N, the reflection coefficient modulus.

* * * * *